L. HEATH.
Optical Instrument.

No. 54,542.

Patented May 8, 1866.

Witnesses:
John Coon.
C. L. Coombs.

Inventor:
Laban Heath
By J. J. Coombs.
his Atty.

UNITED STATES PATENT OFFICE.

LABAN HEATH, OF BOSTON, MASSACHUSETTS.

IMPROVEMENT IN OPTICAL INSTRUMENTS.

Specification forming part of Letters Patent No. 54,542, dated May 8, 1866; antedated May 1, 1866.

*To all whom it may concern:*

Be it known that I, LABAN HEATH, of the city of Boston, in the county of Suffolk and State of Massachusetts, have invented a new and useful Optical Instrument Easily Convertible into a Microscope, a Telescope, and a Magnifying-Eyeglass; and I do hereby declare that the following is a full and exact description thereof, reference being had to the accompanying drawings, and to the letters of reference marked thereon.

Figure 3:
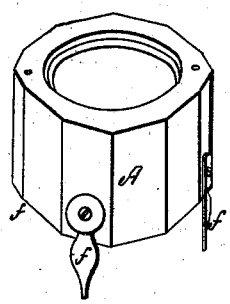
Figure 2:
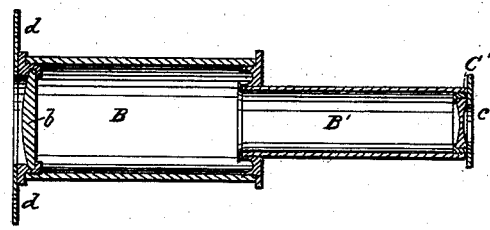
Figure 1:
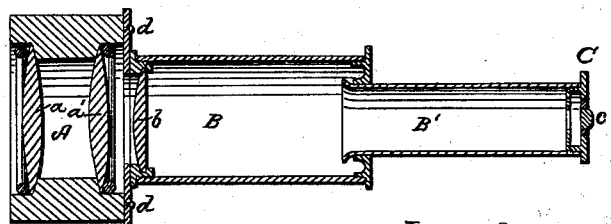

Figure 1 is a sectional view of the instrument when adjusted to be used as a microscope. Fig. 2 is a sectional view of the same adjusted to be used as a telescope. Fig. 3 is a perspective view of that part which, being detached, serves as a magnifying-eyeglass.

Like letters refer to the same parts in all the figures.

A is that portion of the microscope containing the two large double convex lenses $a$ and $a'$, and which, being detached, constitutes a magnifying-eyeglass of great power. B and B' are two ordinary telescope-tubes, one sliding within the other in the ordinary way, and $b$ is a plano-convex lens or the ordinary larger lens of a telescope. C is a cap screwed onto the end of the sliding tube B', containing an achromatic lens, $c$. When these parts are all put together and arranged as shown in Fig. 1 the instrument is a microscope of great magnifying power.

To convert the instrument into a telescope, the part A, containing the two double convex lenses, is detached, and the screw-cap C', containing the concave lens $c'$, is substituted for the screw-cap C, as shown in Fig. 2. The part A being thus detached becomes a convenient magnifying-eyeglass. Said part A is attached to the annular flange $d$ at the end of the tube B by means of pins and slots, so as to be easily detachable, or by other known devices for similar purposes.

The part A is provided with adjustable feet $f f f$, which may be turned up out of the way, or may be attached to a sliding band, so as to be drawn up out of the way when said part A is not in use as an eyeglass.

Having thus fully described my invention and the various modes of carrying it into effect, what I claim as my invention, and desire to secure by Letters Patent, is—

As a new article of manufacture, the convertible optical instrument herein described, constructed, arranged, and operating substantially as set forth.

LABAN HEATH.

Witnesses:
 J. J. COOMBS,
 JOHN COON.